United States Patent
Hoke

(10) Patent No.: US 7,974,510 A0
(45) Date of Patent: Jul. 5, 2011

(54) OPTICAL WAVEGUIDE HAVING A CORE WITH A POLARIZATION-INDEPENDENT, SPATIALLY RECONFIGURABLE REFRACTIVE INDEX

(75) Inventor: Charles D. Hoke, Menlo Park, CA (US)

(73) Assignee: Agilent Technologies, Inc., Palo Alto, CA (US)

(*) Notice: Subject to any disclaimer, the term of this patent is extended or adjusted under 35 U.S.C. 154(b) by 88 days.

(21) Appl. No.: 10/447,831

(22) Filed: May 29, 2003

(65) Prior Publication Data

US 2004/0240832 A1 Dec. 2, 2004

(51) Int. Cl.
*G02B 6/16* (2006.01)

(52) U.S. Cl. .......................... 385/143; 385/122; 385/142

(58) Field of Classification Search .................... 385/28, 385/37, 123–130, 132, 141–143
See application file for complete search history.

(56) References Cited

U.S. PATENT DOCUMENTS

| 5,361,320 A | 11/1994 | Liu et al. | |
|---|---|---|---|
| 5,532,854 A * | 7/1996 | Fergason | 349/200 |
| 6,108,476 A * | 8/2000 | Iimura | 385/128 |
| 6,686,984 B1 * | 2/2004 | Hoke et al. | 385/143 |
| 2002/0136497 A1 * | 9/2002 | McGarry et al. | 385/39 |

FOREIGN PATENT DOCUMENTS

| EP | 1 213 594 A | 6/2002 |
| EP | 1 279 998 A | 1/2003 |
| EP | 1 482 352 | * 12/2004 |
| WO | 01/95024 A | 12/2001 |

OTHER PUBLICATIONS

Article entitled Preparation of Photonic Crystals Made of Air Spheres in Titania by Judith E.G.J. Winjnhoven and Willem L. Vos, dated Aug. 7, 1998, vol. 281, SCIENCE, www.sciencemag.org. pp. 802-804.
Jeong Y. et al., "Electrically Controllable Long-Period Liquid Crystal Fiber Gratings", IEEE Photonics Technology Letters, vol. 12, No. 5, May 2000, pp. 519-521.

* cited by examiner

Primary Examiner — Frank G. Font
Assistant Examiner — James P. Hughes

(57) ABSTRACT

A waveguide having a spatially-variable refractive index is disclosed. The waveguide having a spatially-variable refractive index comprises a light-propagating medium and a non-uniform distribution of liquid crystal material in a matrix of dielectric material located in a portion of the light-propagating medium.

14 Claims, 6 Drawing Sheets

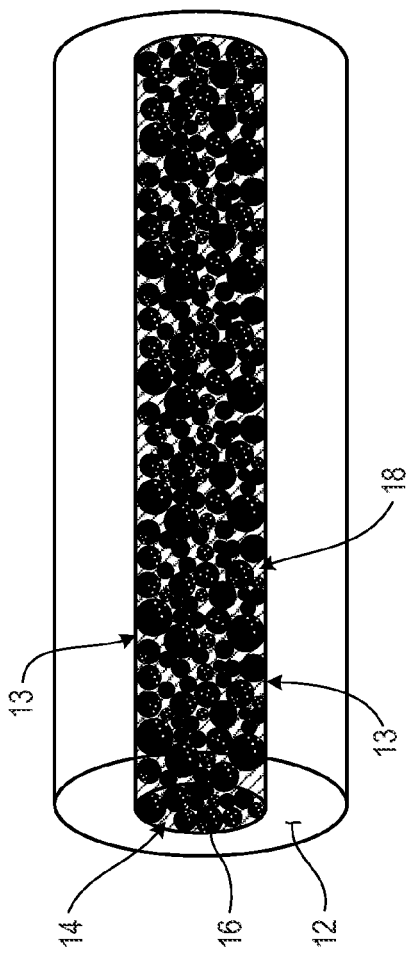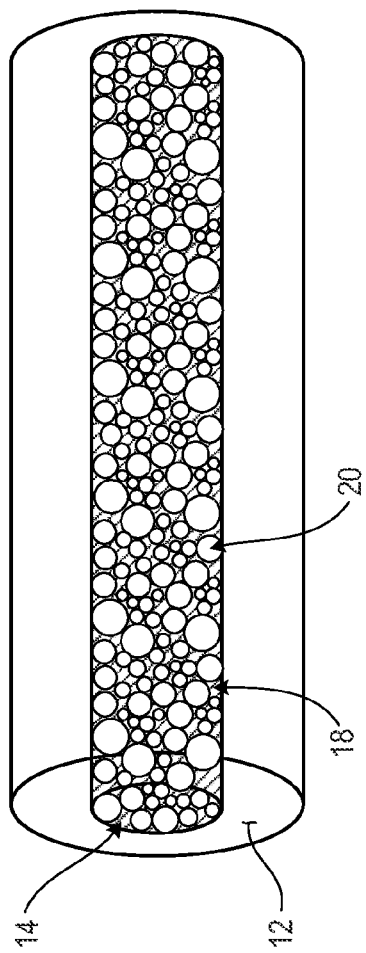

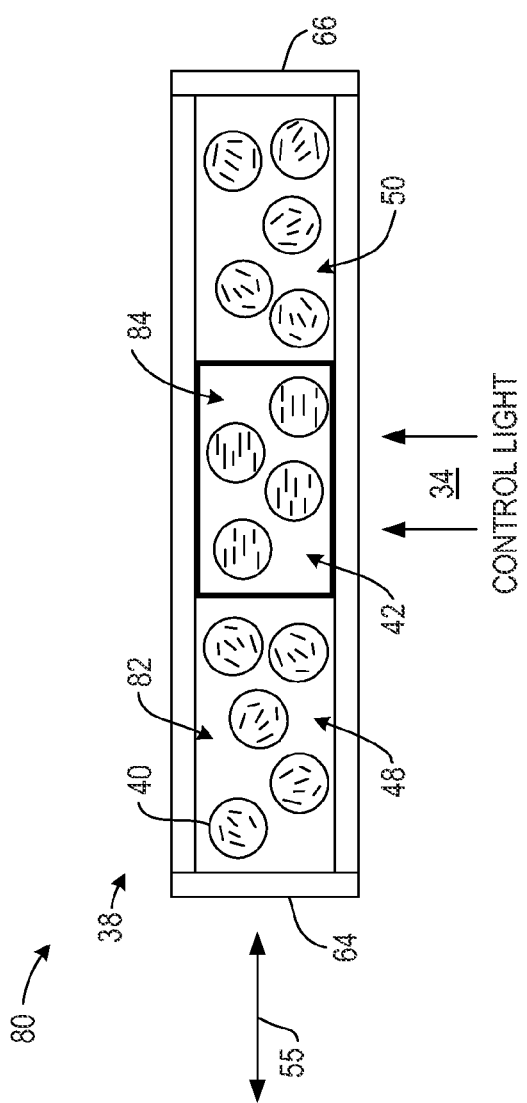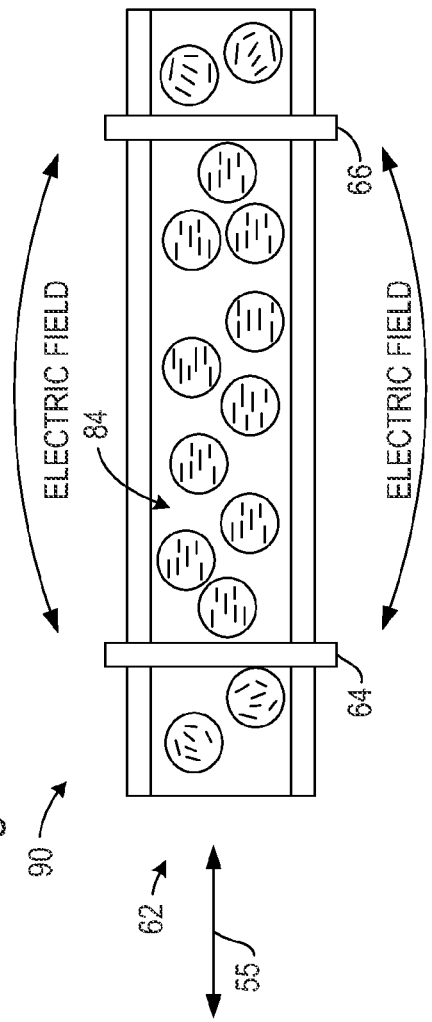

OPTICAL WAVEGUIDE HAVING A CORE WITH A POLARIZATION-INDEPENDENT, SPATIALLY RECONFIGURABLE REFRACTIVE INDEX

TECHNICAL FIELD

The present invention relates generally to optical devices, and, more particularly, to an optical waveguide having a core with a polarization-independent, spatially reconfigurable longitudinal refractive index.

BACKGROUND OF THE INVENTION

Communication technology has progressed significantly in the past few years. Today, much information is carried over optical fiber. Optical fibers are capable of transporting information at data rates currently exceeding billions of bits per second. Part of the technology that enables communication using optical fibers is the ability to direct signal light onto an optical fiber and to switch that light appropriately. It is also desirable to have the ability to selectively filter the signal light that is passing through the optical fiber.

Currently, fiber Bragg gratings (FBG) are typically used to provide wavelength-specific filtering of the signal light propagating through an optical fiber. An FBG is in a region of an optical fiber in which the refractive index of the core repetitively alternates between a high value and a low value along the length of the fiber. An FBG is fabricated by temporarily illuminating a photosensitive optical fiber with a light pattern generated by passing light from an ultraviolet (UV) laser through a phase mask. The resulting pattern of alternating illumination intensity establishes a region in the optical fiber in which the refractive index of the core alternates as described above. The region of alternating refractive index remains and acts as an FBG with a fixed optical filter characteristic. The FBG can be structured to produce various filter characteristics, such as a notch filter, a broadband filter, etc. Optical fibers incorporating one or more FBGs are typically used in fixed add/drop multiplexers, erbium doped fiber amplifier (EDFA) gain flatteners, dispersion compensators and fiber lasers, for example.

An FBG can be tuned by mechanically elongating the optical fiber by heating and/or mechanically stretching the fiber. Elongating the fiber changes the spatial frequency of the region of alternating refractive index and, hence, the optical filter characteristic provided by the FBG. Unfortunately, mechanically elongating the optical fiber can significantly reduce the long-term stability of the fiber. Moreover, mechanically elongating the optical fiber to change the spatial frequency of the region of alternating refractive index changes only the center wavelength of the filter characteristic. Mechanical elongation cannot be used to change the characteristics of the filter passband.

Therefore, there is a need for an optical waveguide having a core whose refractive index can be spatially reconfigured at will for use in the applications described above and in other applications. There is also a need for an optical waveguide having a core whose refractive index is polarization-independent.

SUMMARY OF THE INVENTION

The invention provides an optical waveguide having a core with a polarization-independent, spatially reconfigurable refractive index. In one embodiment, the optical waveguide comprises a light-propagating medium and a non-uniform distribution of liquid crystal material in a matrix of dielectric material located in a portion of the light-propagating medium. The refractive index of the core of the waveguide has a spatial configuration established by means including the photo-refractive effect and the electro-optic effect. Means including the photorefractive effect and the electro-optic effect can also be used at will to change the spatial configuration of the refractive index of the core. Hence, the refractive index of the core can accurately be described as being spatially reconfigurable.

The non-uniform distribution of the liquid crystal material in the core can be accomplished by distributing the liquid crystal material in substantially spherically-shaped droplets having a range of sizes smaller than the wavelength of signal light propagating through the waveguide. The non-uniform distribution of the liquid crystal material makes the refractive index of the waveguide core independent of the polarization of the signal light.

BRIEF DESCRIPTION OF THE DRAWINGS

The invention, as defined in the claims, can be better understood with reference to the following drawings. The components within the drawings are not necessarily to scale-relative to each other, emphasis instead being placed upon clearly illustrating the invention.

FIGS. 1A through 1E are a series of schematic diagrams showing an exemplary embodiment of a method for fabricating an optical waveguide having a core with a polarization-independent, spatially reconfigurable refractive index in accordance with the invention.

FIG. 4A is a detailed schematic diagram of a portion of the optical waveguide shown in FIG. 2.

FIG. 4B is a detailed schematic diagram of a portion of the optical waveguide shown in FIG. 3.

DETAILED DESCRIPTION

The invention provides an optical waveguide having a core with a polarization-independent, spatially reconfigurable refractive index. The optical waveguide can have any one of a variety of waveguide geometries and can be used in a variety of applications in which an optical waveguide having a core with a polarization-independent, spatially reconfigurable refractive index is desired. Such applications include, for example, a filter for a wavelength division multiplexing system, a tunable fiber laser, a dynamic wavelength equalizer, an EDFA gain flattener, an optical switch, and a dispersion compensator. Further, as will be described below, the spatial configuration of the refractive index of the core of the optical waveguide can be initially established by the photorefractive effect, the electro-optic effect or by some other method capable of imposing spatial variations on the refractive index of the liquid crystal material that forms part of the material of core of the optical waveguide along the length of the optical waveguide. Such means can also be used at will to change the spatial configuration of the refractive index of the core.

To simplify the following description, an example of the optical waveguide structured as an optical fiber will be described. The optical waveguide may have a structure other than that illustrated.

Figure 1A:
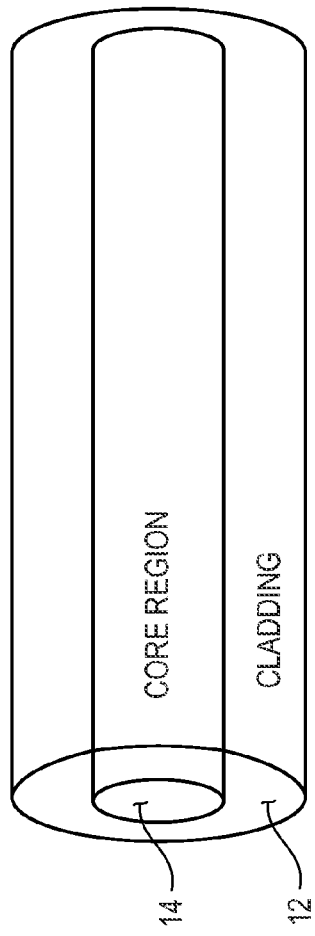
Figure 1B:
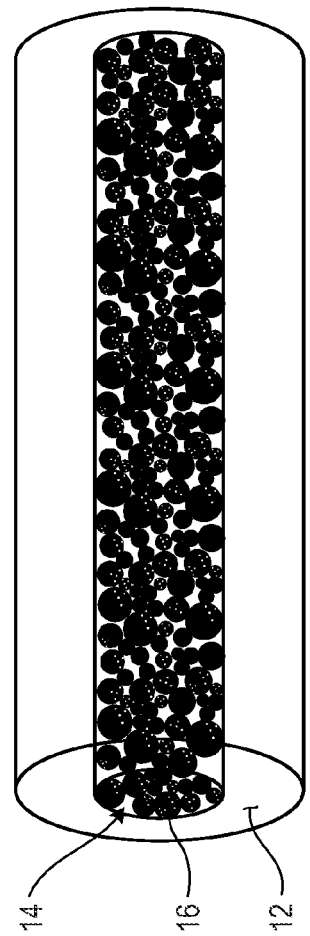
Figure 1E:
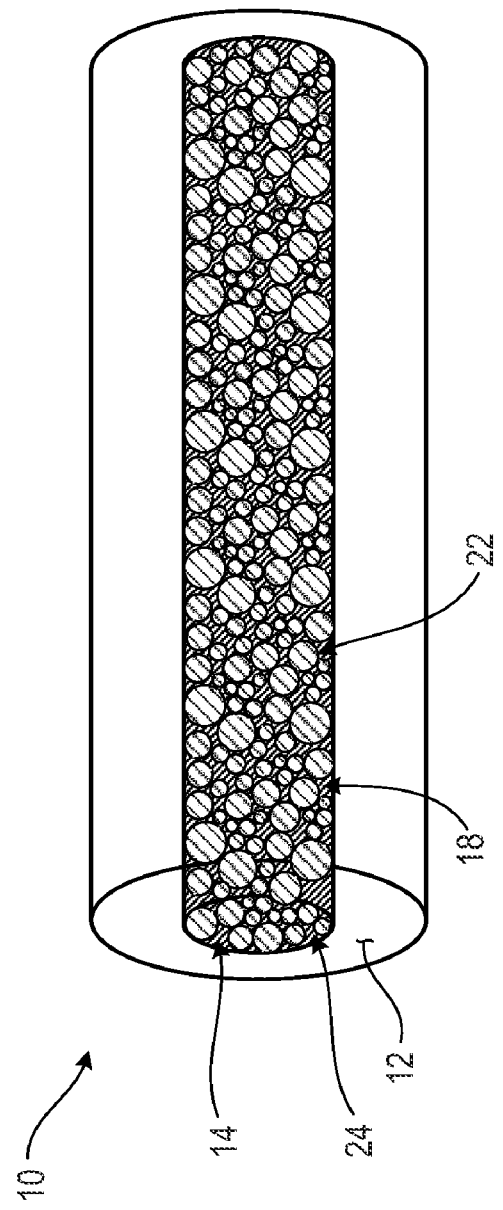

FIGS. 1A through 1E are a series of schematic diagrams showing an exemplary embodiment of a method in accordance with the invention for fabricating an embodiment of an optical waveguide having a core with a polarization-independent, spatially reconfigurable refractive index in accordance with the invention. The finished optical fiber 10 is shown in FIG. 1E, which will be described in further detail below. Optical fiber 10 may be a discrete optical fiber, but it is typically part of, or is attached to, a substantially longer length of optical fiber (not shown) whose core is a conventional, fixed refractive index core.

FIG. 1A is a schematic view illustrating a cladding 12 that constitutes the starting point for fabricating optical fiber 10 having a core with a polarization-independent, spatially reconfigurable refractive index. As noted above, an optical fiber having a core with a polarization-independent, spatially reconfigurable refractive index is an example of an optical waveguide having such a core in accordance with the invention. Cladding 12 is elongate, cylindrical and hollow and defines an elongate, cylindrical core region 14 in which a core having a polarization-independent, spatially reconfigurable refractive index will be fabricated. The material of cladding 12 is typically glass, plastic or another suitable material. The material of the cladding has a refractive index slightly less than the maximum effective refractive index of the core that will be fabricated in core region 14.

FIG. 1B shows the core region 14 filled with spacers. An exemplary spacer is shown at 16. The spacers are typically substantially spherical, but may have another 3-dimensional shape or other 3-dimensional shapes. The material of the spacers 16 can be rubber, polystyrene, latex or any other suitable material. In accordance with an embodiment of the invention, the spacers 16 are spherical in shape and range in diameter from a few nanometers (nm) to a maximum that is typically smaller than one wavelength ($\lambda$) of the signal light that is expected to propagate through the optical fiber. In another embodiment, the spacers 16 are all uniform in diameter. However, spacers having a range of different diameters fill the core region 14 less uniformly, which is desired as will be described below. A process that can be used to fill the core region 14 with spacers 16 is described by Judith E. G. J. Wijnhoven and Willem L. Vos in *Preparation of Photonic Crystals Made of Air Spheres in Titania*, SCIENCE, 802–804 (Aug. 7 1998).

As an example, in an embodiment optimized for propagating signal light having a wavelength of 1.5 µm, the spacers 16 have diameters of 50 nm and 100 nm. The quantity of the spacers 16 used to fill the core region 14 is calculated so that the spacers occupy a predetermined fraction of the volume of the core region 14. The fraction of the volume of the core region 14 occupied by the spacers 16 defines the fraction of the volume of the core region that will later be occupied by liquid crystal material. The fraction of the volume of the core region 14 occupied by the liquid crystal material should be as large as possible consistent with the liquid crystal material remaining as substantially independent droplets. Maximizing the fraction of the volume of the core region 14 occupied by the liquid crystal material provides the widest possible range of variation of the refractive index of the core of the optical fiber.

FIG. 1C shows a dielectric material 18 added to the core region 14 to fill the volume of the core region not occupied by the spacers 16. The dielectric material 18, together with the inner wall 13 of the cladding 12, encapsulates the spacers 16. One method that may be used to fill the unoccupied volume of the core region 14 with the dielectric material 18 is the sol-gel process using titanium dioxide ($TiO_2$) or silicon dioxide ($SiO_2$) as a precursor, as is known in the art. An exemplary process suitable for filling the unoccupied volume of the core region 14 with the dielectric material is described by Judith E. G. J. Wijnhoven and Willem L. Vos in *Preparation of Photonic Crystals Made of Air Spheres in Titania*, SCIENCE, 802–804 (Aug. 7 1998).

FIG. 1D shows the spacers 16 removed from the core region 14. The spacers can be removed from the core region 14 by heating them to a temperature at which they gasify. The spacers gasify, by, for example, evaporation, sublimation or decomposition. Alternatively, the spacers can be removed from the core region by immersing the cladding 12 in a fluid that dissolves the spacers 16.

After removal of the spacers 16, the dielectric material 18 defines in the core region 14 a rigid, sponge-like structure that includes a non-uniform distribution of interconnected voids. An exemplary void is indicated by the reference numeral 20. The sponge-like structure may also be described as a disordered array of voids that fills the core region 14.

FIG. 1E shows the voids 20 filled with liquid crystal material 22. Filling the voids with the liquid crystal material completes the fabrication of the core 24 in the core region 14 of the optical fiber 10. The core 24 has a polarization-independent, spatially reconfigurable refractive index. The voids 20 are filled with the liquid crystal material 22 by a vacuum filling process, for example. Suitable vacuum filling processes are known in the art.

The core 24 comprises a non-uniform distribution (i.e., a disordered array) of liquid crystal material 22 located in the voids 20 in the dielectric material 18 in the core region 14. The liquid crystal material 22 occupies a large fraction of the volume of the core region 14. The dielectric material 18 divides the liquid crystal material into droplets defined by the voids 20 in the dielectric material. The non-uniform distribution of the liquid crystal material in the core 24 is the result of the non-uniform packing of the spacers 16 in the core region 14. The non-uniform distribution of the spacers provides the non-uniform distribution of the voids 20 in which the liquid crystal material is located.

Dispersing the liquid crystal material 22 in such a non-uniform structure results in the core 24 having a refractive index that varies spatially over dimensions smaller than the size of the largest void 20. However, the refractive index of the core remains substantially uniform over dimensions larger than the size of the largest void. Spatial variations over dimensions larger than the largest void could cause the optical fiber 10 to act as a dielectric filter or a crystalline material. Neither of these characteristics desirable in the intended applications. The original packing arrangement of the spacers 16, which results in the non-uniform distribution of the voids 20, fills a large faction of the volume of the core region 14 with the spacers 16. As a result, a large fraction of the volume of the core region 14 is filled with the liquid crystal material 22 whose refractive index can be changed. The resulting non-uniform distribution of the liquid crystal material 22 makes the refractive index of the core of the optical fiber 10 independent of the polarization of the signal light propagating through the optical fiber 10.

Signal light propagating through the optical fiber 10 is exposed at each point along the length of the core 24 to an area-weighted average refractive index. The area-weighted average refractive index is equal to the sum of the product of the refractive index $n_i$ of each object located in a cross-section of the core 24 at the point and the fraction $A_i$ of the area of the cross-section occupied by the object, i.e., $$n_{av} = \sum_{i=1}^{N} n_i A_i,$$

where $n_{av}$ is the area-weighted average refractive index and N is the number of objects in the cross-section. The objects in the core are the dielectric material 18 and the liquid crystal material 22, which is embodied as droplets that fill the voids 20. The refractive index encountered by the signal light propagating through the optical fiber 10 will only be the area-weighted average refractive index if all the objects in the cross-section of the core 24 are smaller than the wavelength of the signal light.

In an embodiment in which spacers 16 having only two different sizes were used in the process shown in FIG. 1B, the spacers 16 pack together into a dense, disordered structure. Since the structure is disordered, the gaps between the spacers 16 will have non-uniform sizes. However, few of the gaps between spacers 16 will be larger than the smaller of the two sizes of the spacers since one of the smaller spacers will probably fill a gap larger than that size. Therefore, the gaps between the spacers that are filled with the dielectric material 18 in the process illustrated in FIG. 1C have a characteristic size that is about the same size as the spacers. Accordingly, provided that the spacers are smaller than the wavelength of the signal light, none of the regions of the dielectric material and none of the droplets of the liquid crystal material will be larger than the wavelength of the signal light, and the signal light propagating through the waveguide will be exposed to the area-weighted average refractive index described above.

A liquid crystal material is composed of anisotropic liquid crystals capable of flowing like a liquid. Liquid crystals typically have three principal refractive indices. The three principal refractive indices of a liquid crystal are named $n_e$, $n_o$ and $n_o$ by convention, where n is a variable that represents refractive index and the suffices e and o indicate that the refractive index pertains to extraordinary and ordinary, respectively. Two of the refractive indices are the same because the liquid crystals have an anisotropic shape in which the width (associated with refractive index $n_o$) and height (associated with refractive index $n_o$) are equal to one another and are substantially smaller than the length (associated with refractive index $n_e$). Liquid crystals can be regarded as having width, height and length axes. The length axis is commonly referred to as the major axis.

As noted above, the dielectric material 18 typically forms a sponge-like structure whose voids are filled with the liquid crystal material 22. At each point along the length of the core 24, signal light propagating through the optical fiber 10 is exposed to a two-dimensional slice of the sponge-like structure composed of voids in the dielectric material 18 filled with droplets of the liquid crystal material 22. The sponge-like structure has a refractive index equal to the area-weighted average of the refractive indices of the dielectric material 18 and the liquid crystal material 22. With no orientation-defining field, such as an electric or magnetic field, applied to the optical waveguide 10, the major axes of the liquid crystals in the droplets of liquid crystal material 22 are randomly oriented as shown in region 82 of FIG. 4A, which will be described in more detail below. As a result, the refractive index of the liquid crystal material 22 is the spatial average of the refractive indices of the liquid crystals.

The spatial average of the refractive indices of the liquid crystal material 22, which is sometimes referred to as the effective refractive index, is given by $(n_e+2n_o)/3$. The dielectric material 18 has a refractive index given by $n_d$, where n is a variable that represents refractive index and the suffix d indicates that the refractive index pertains to the dielectric material 18. Thus, in the absence of an orientation-defining field, the refractive index of the core 24 is the area-weighted average of the refractive index $n_d$ of the dielectric material and the effective refractive index $(n_e+2n_o)/3$ of liquid crystal material 22.

An orientation-defining field, which is typically an electric field or a magnetic field, applied to the optical fiber 10 in the appropriate direction aligns the major axes of the liquid crystals in the droplets of liquid crystal material 22 parallel to the direction in which the signal light propagates through the optical fiber. The signal light is exposed to a refractive index that is the area-weighted average of the refractive index $n_d$ of the dielectric material 18 and the refractive index of the liquid crystal material 22, as described above. However, the refractive index of the liquid crystal material 22 is now equal to $n_o$ as a result of the aligned orientation of the liquid crystals.

Signal light of any polarization that impinges on the liquid crystal material 22 is exposed to the same refractive index, regardless of whether an orientation-defining field is applied to the optical waveguide 10. The dielectric material also has a polarization-independent refractive index. Thus, signal light of any polarization is exposed to the same refractive index, and the refractive index of the core 24 and the optical properties of optical waveguide 10 are polarization-independent.

The sizes of the spacers 16 control the fraction of the volume of the core region 14 occupied by the spacers. Removing the spacers 16, leaving the voids 20, and filling the voids with the liquid crystal material 22 forms an amorphous structure that has no crystalline properties and behaves as described above. The refractive index of the liquid crystal material can be changed by applying an orientation-defining field. The optical fiber 10 shown in FIG. 1E therefore includes a core 24 that has a refractive index that can be spatially configured over a wide range by an orientation-defining field. For example, applying an orientation-defining field whose strength varies cyclically along the length of core 24 configures the refractive index of the core to vary cyclically along the length of the optical fiber 10. A core whose refractive index varies cyclically along the length of the optical fiber provides the optical fiber with the characteristics of a fiber Bragg grating. Moreover, the spatial configuration of the refractive index can be changed at will simply by changing the spatial wavelength of the orientation-defining field. Changing the spatial wavelength of the orientation-defining field changes the optical properties of the fiber Bragg grating.

The orientation-defining field that defines the spatial configuration of the refractive index of the core 24 can be established using the photorefractive effect, the electro-optic effect or another suitable effect. The formulation of the liquid crystal material used to fill the voids 20 depends on the effect used. For example, in an embodiment in which the photorefractive effect is used, the liquid crystal material can be doped with an organic dye, such as rhodamine 6G (R6G), or can be doped with an electron donor/acceptor pair, such as perylene and N,N'-di(n-octyl)-1,4,5,8-napthalenediimide. In such an embodiment, the orientation-defining field that defines spatial configuration of the refractive index of the core 24 of the optical fiber 10 is established by illuminating the optical fiber 10 with control light having a wavelength that matches an absorption wavelength of the dopant.

The control light is generated by an external control light source (not shown) such as a light-emitting diode or a laser. The refractive index of the liquid crystal material changes in regions of the core where the control light illuminates the liquid crystal material, as will be described below with reference to FIG. 2. In this example, the photorefractive effect establishes an electric orientation-defining field that spatially configures the refractive index of the core 24. The addition of a dopant to the liquid crystal material 22 causes a photorefractive response in the liquid crystal material.

The dopant should be transparent at the wavelength of the signal light propagating through the optical fiber 10, but should be absorptive at the wavelength of the control light. Absorption of control light by the dopant ionizes the dopant, which results in charge separation. The charge separation establishes the electrostatic field in the liquid crystal material. The electrostatic field acts as the orientation-defining field that defines the orientation the major axes of the liquid crystals in the droplets of the liquid crystal material 22, and thus changes the effective refractive index of the liquid crystal material, as described above.

In another embodiment, the orientation-defining field that defines the refractive index of the core 24 of the optical fiber 10 is an electric field established by the electro-optic effect. In such embodiment, electrodes (not shown) apply an electric field to the optical waveguide 10. The electric field acts as an orientation-defining field for the liquid crystal material 22. Alternatively, a magnetic field is applied to the optical waveguide 10 and, hence, to the liquid crystal material 22 as the orientation-defining field. The orientation-defining field defines the orientation the major axes of the liquid crystals in the droplets of the liquid crystal material 22, and thus changes the effective refractive index of the liquid crystal material, as described above.

Figure 2:
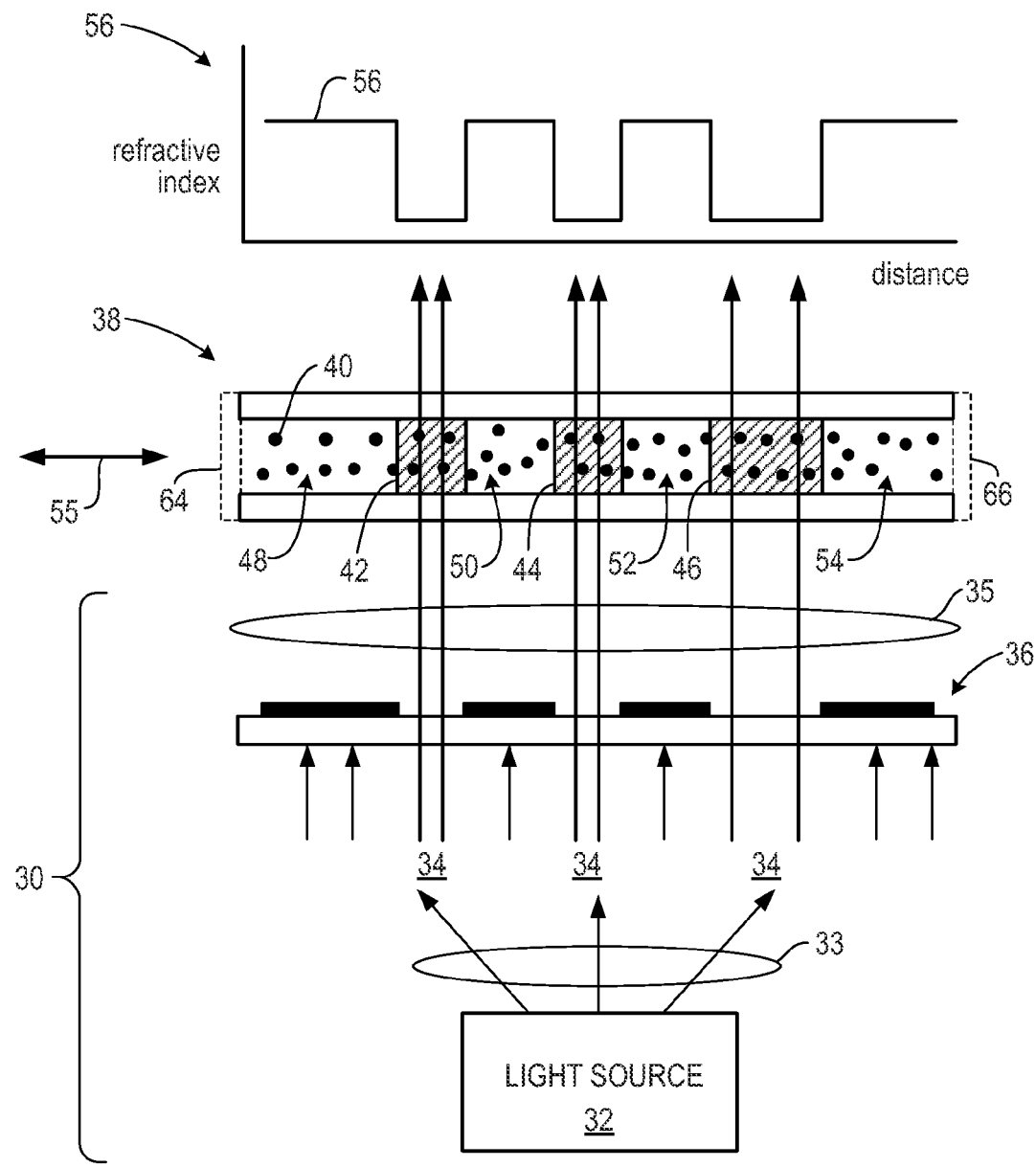
FIG. 2 is a schematic diagram of an exemplary embodiment of an optical waveguide having a core with a polarization-independent, spatially reconfigurable refractive index in accordance with the invention.

FIG. 2 is a schematic diagram illustrating an exemplary embodiment of an optical waveguide that includes a core whose refractive index is spatially configured using the photorefractive effect. The example of the optical waveguide shown is structured as an optical fiber 38. The optical fiber 38 is shown located in a control system 30 that applies to the optical fiber a control light in a configurable spatial pattern. The control system 30 can incorporate one of a number of different structures that project the control light onto the optical fiber 38 in a configurable pattern. The configurable pattern of the control light generated by the optical system 30 initially sets the spatial configuration of the refractive index of the core of the optical fiber 38 and additionally allows the spatial configuration of the refractive index to be changed at will.

The example of the control system 30 is composed of a light source 32, illumination optics 33, a spatial light modulator 36 and imaging optics 35. The illumination optics 33, the spatial light modulator 36 and the imaging optics 35 are arranged in order between the light source and the optical fiber 38.

The light source 32 emits control light indicated by arrows 34. The control light 34 illuminates the illumination optics 33. The illumination optics are structured to alter one or more of the following exemplary characteristics of the control light 34: beam size, numerical aperture and intensity. The control light 34 from the illumination optics 33 illuminates the spatial light modulator 36. The spatial light modulator 36 spatially modulates the intensity and/or the phase of the control light 34 to define a pattern of the control light that is projected by imaging optics 35 onto the optical fiber 38.

The optical fiber 38 is similar to the optical fiber 10 shown in FIGS. 1A–1E and includes a core having a polarization-independent, spatially reconfigurable refractive index. In this example, the liquid crystal material 40 located in the core of the optical fiber 38 has been doped with an organic dye, as described above.

The light source 32 generates the control light 34 at a wavelength different from the wavelength range of the signal light that will propagate through the optical fiber 38. The organic dye that forms part of the liquid crystal material 40 absorbs light at the wavelength of the control light 34, but is transparent at the wavelength of signal light. The direction of propagation of the signal light is indicated by arrow 55.

The control light 34 illuminates the optical fiber 38 in the regions 42, 44 and 46. The electric field established by illuminating the regions 42, 44 and 46 of the optical fiber with the control light 34 aligns the major axes of the liquid crystals in the droplets of liquid crystal material 9 in these regions. The major axes of the liquid crystals in the unilluminated regions 48, 50, 52 and 54 of the optical fiber 38 remain randomly oriented. As a result, the refractive index of the liquid crystal material in the regions 42, 44 and 46 differs from that of the liquid crystal material in the regions 48, 50, 52 and 54.

Curve 58 in the graph 56 that forms part of FIG. 2 represents the spatial configuration of the refractive index of the core of the optical fiber 38. The curve 58 shows the cyclic variation of the refractive index along the length of the optical fiber. The refractive index is lower in the regions 42, 44 and 46 than in the regions 48, 50 and 52 of the optical fiber.

The spatial light modulator 36 is dynamically configurable by means of an electrical signal to define the pattern of the control light 34 projected onto the optical fiber 38. This allows the spatial configuration of the refractive index of the core of the optical fiber 38 to be configured initially and to be reconfigured at will at any time thereafter. The pattern of the control light can be static. Such a static pattern of the control light configures the optical fiber 38 for a particular application. Alternatively, the pattern of the control light can be changed dynamically to allow the spatial configuration of the refractive index of the core of the optical fiber 38 to be reconfigured to perform such operations as switching, controlling, tracking, multiplexing, demultiplexing and filtering.

The range over which the refractive index of the core of the optical fiber 38 can be configured can be increased by adding optional electrodes 64 and 66. The electrodes 64 and 66 are used to apply a static electric field to optical fiber 38 and, hence to the liquid crystal material 40. The static electric field increases the effect of the photoelectrically-applied orientation defining field. When a static electric field is applied to a photoelectrically-applied orientation defining field, the static electric field enhances the photorefractive response of the liquid crystal material. See e.g., "Introduction to Photorefractive Nonlinear Optics," Pochi Yeh, John Wiley and Sons, New York, 1993.

Figure 3:
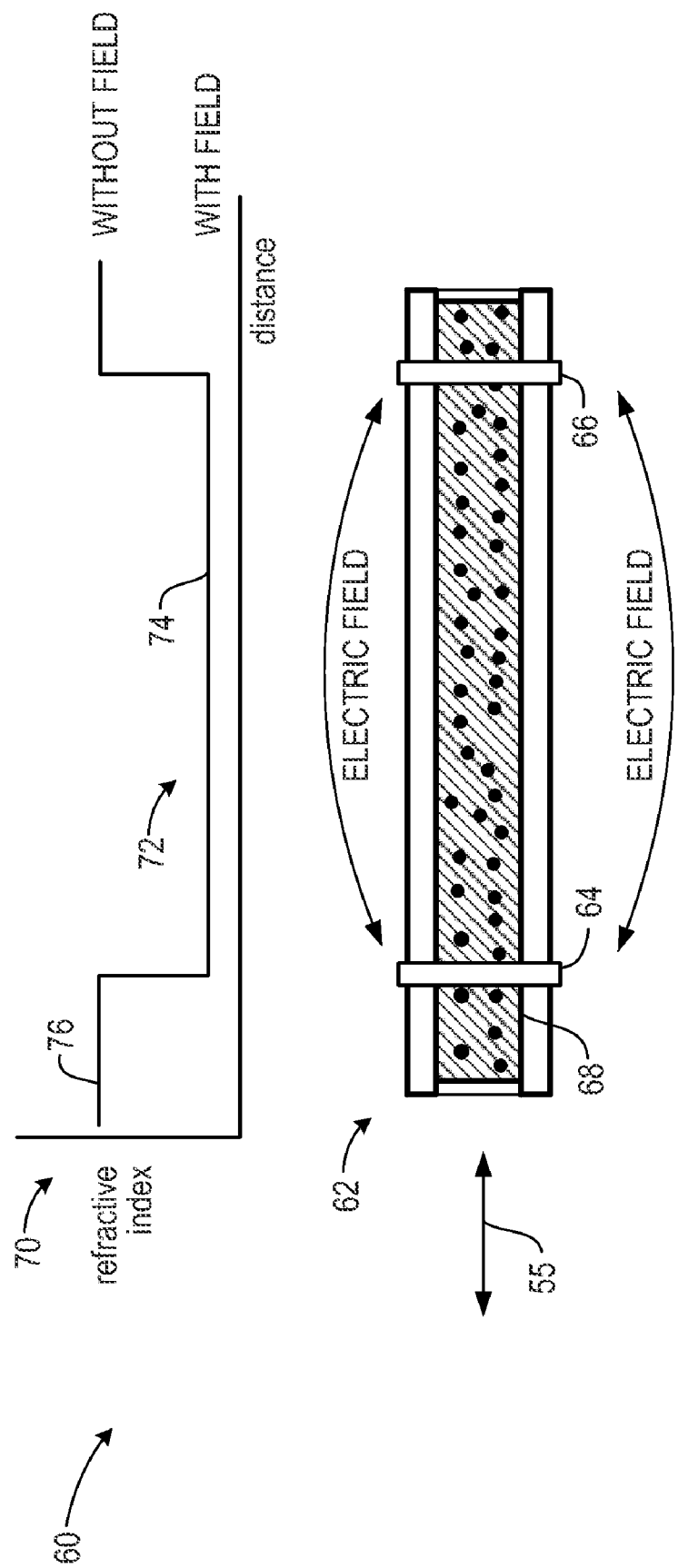
FIG. 3 is a schematic diagram of an optical waveguide having a core with a polarization-independent, spatially reconfigurable refractive index that operates by the electro-optic effect.

FIG. 3 is a schematic diagram illustrating an exemplary embodiment of an optical waveguide that includes a core whose refractive index is spatially configured using the electro-optic effect. The example of the optical waveguide shown is structured as an optical fiber 62 similar to the optical fiber 10 described above with reference to FIGS. 1A–1E. However, in this embodiment, the liquid crystal material 68 in the core of the optical fiber is responsive to an externally-applied electric or magnetic orientation-defining field, and does not include a dopant. Electrodes 64 and 66 are located adjacent opposite ends of the optical fiber 62 and are transparent to the signal light propagating through the optical fiber 62 in the direction indicated by the arrow 55. Other electrode configurations are also possible. For example, electrodes may be configured as rings surrounding the optical fiber. The electrodes 64 and 66 apply an electric field along the length of the optical fiber, parallel to the direction 55 of the signal light propagating through the optical fiber. A voltage difference applied between the electrodes 64 and 66 establishes an external orientation-defining electric field that reorients the liquid crystals in the droplets of liquid crystal material 68 in the core of the optical fiber. The reorientation of the liquid crystals changes the refractive index of the liquid crystal material 68. The change in the refractive index of the liquid crystal material changes the spatial configuration of the refractive index of the core of the optical fiber 62, as described above.

Curve 72 in the graph 70 that forms part of FIG. 3 represents the spatial configuration of the refractive index of the core of the optical fiber 62. The curve 72 shown includes a portion 74 and a portion 76. The portion 74 indicates that the liquid crystal material between the electrodes 64 and 66 has a refractive index different from the refractive index of the material (not shown) outside of the electrodes 64 and 66 indicated by portion 76. An arrangement of electrodes more complex than that exemplified in FIG. 3 may be used to define a more complex spatial configuration of the refractive index than that shown.

FIG. 4A is a detailed schematic diagram 80 illustrating a portion of the optical fiber 38 shown in FIG. 2. As described above, the core of the optical fiber 38 includes droplets of liquid crystal material 40. In the region 42 in which control light 34 impinges on the liquid crystal material 40, the orientation-defining field generated by the photorefractive effect reorients the major axes of the liquid crystals in the droplets of liquid crystal material 40, as illustrated using reference numeral 84. The major axes of the liquid crystals in the droplets 40 in region 42 are oriented substantially parallel to one another while the major axes of the liquid crystal material in the droplets in regions 48 and 50, where no orientation-defining field exists, remain randomly oriented. Thus, the control light 34 incident on region 42 makes the refractive index of the liquid crystal material in region 42 different from that of the liquid crystal material in regions 48 and 50.

FIG. 4B is a detailed schematic diagram 90 illustrating a portion of the optical fiber 62 shown in FIG. 3. An electric field created by the electrodes 64 and 66 reorients the major axes of the liquid crystals in the droplets of the liquid crystal material 68 to align the major axes with the electric field as shown using reference numeral 84. Thus, the refractive index of the liquid crystal material to which the electric field is applied is different from that of the liquid crystal material to which no electric field is applied.

Many modifications and variations may be made to the preferred embodiments of the present invention, as set forth above, without departing substantially from the invention. All such modifications and variations are intended to be included herein within the scope of the invention defined in the claims that follow.

What is claimed is:

1. An optical waveguide, comprising:
   a cladding and a core region, the cladding at least partially surrounding the core region; and
   located in the core region, a core comprising a non-uniform distribution of liquid crystal material in a matrix of dielectric material, the core having a polarization-independent, spatially reconfigurable refractive index, wherein a photorefractive effect induces the reconfiguration of the spatially reconfigurable refractive index.

2. The optical waveguide of claim 1, wherein the non-uniform distribution of liquid crystal material comprises droplets of the liquid crystal material, the droplets having a range of sizes.

3. The optical waveguide of claim 2, wherein the droplets are substantially spherical in shape.

4. The optical waveguide of claim 2, wherein the droplets have sizes less than the wavelength of light propagating through the waveguide.

5. The optical waveguide of claim 2, wherein the non-uniform distribution of liquid crystal material makes the refractive index of the core independent of polarization of the light propagating through the waveguide.

6. The optical waveguide of claim 1, additionally comprising electrodes located to apply an electric field to at least part of the core to change the refractive index thereof.

7. The optical waveguide of claim 1, wherein the dielectric material comprises titanium dioxide.

8. The optical waveguide of claim 1, wherein the liquid crystal material comprises an organic dye.

9. The optical waveguide of claim 8, wherein the organic dye causes the liquid crystal material to be photorefractive.

10. The optical waveguide of claim 9, further additionally comprising a spatial light modulator through which control light is passed to change a spatial configuration of the refractive index of the core.

11. The optical waveguide of claim 9, wherein the liquid crystal material is optically transparent to signal light propagating along the optical waveguide and absorbent of the control light.

12. A method for spatially configuring the refractive index of the core of an optical waveguide, the method comprising:
    providing an optical waveguide comprising a cladding and a core, the cladding surrounding the core, the core including a non-uniform distribution of liquid crystal material in a dielectric material matrix; and
    spatially selectively changing the refractive index of the liquid crystal material, wherein a photorefractive effect induces the change in the refractive index.

13. The method of claim 12, in which spatially selectively changing the refractive index of the liquid crystal material comprises changing the refractive index of the liquid crystal material by an electro-optic effect.

14. The method of claim 12, wherein the optical waveguide is an optical fiber.

* * * * *